(12) United States Patent
Sagnella

(10) Patent No.: US 10,508,756 B1
(45) Date of Patent: Dec. 17, 2019

(54) WIRE GUARD DEVICE

(71) Applicant: SUPER SOD, LLC, Fort Valley, GA (US)

(72) Inventor: Nick Sagnella, Charlotte, NC (US)

( * ) Notice: Subject to any disclaimer, the term of this patent is extended or adjusted under 35 U.S.C. 154(b) by 0 days.

(21) Appl. No.: 16/012,332

(22) Filed: Jun. 19, 2018

(51) Int. Cl.
| | |
|---|---|
| *F16L 1/06* | (2006.01) |
| *F16L 3/01* | (2006.01) |
| *E02D 5/80* | (2006.01) |
| *E04H 15/62* | (2006.01) |

(52) U.S. Cl.
CPC ............... *F16L 3/01* (2013.01); *E02D 5/80* (2013.01); *E04H 15/62* (2013.01); *F16L 1/06* (2013.01)

(58) Field of Classification Search
USPC .............................. 248/74.5, 71; 52/155, 102
See application file for complete search history.

(56) References Cited

U.S. PATENT DOCUMENTS

| | | | | | |
|---|---|---|---|---|---|
| 1,841,353 | A | * | 1/1932 | Boggess | F16B 15/0015 174/159 |
| 1,855,471 | A | * | 4/1932 | Buchanan | F16B 15/0015 248/71 |
| 3,848,080 | A | * | 11/1974 | Schmidt | F16B 15/02 174/159 |
| 3,885,491 | A | * | 5/1975 | Curtis | F16B 15/0015 248/71 |
| 4,796,848 | A | * | 1/1989 | Lanz | F16B 15/00 174/159 |
| 4,807,417 | A | * | 2/1989 | Bell | F16B 15/003 174/507 |
| 5,150,865 | A | * | 9/1992 | Miller | F16B 21/088 248/220.41 |
| 5,184,792 | A | * | 2/1993 | Bernhard | H02G 3/26 248/71 |

FOREIGN PATENT DOCUMENTS

JP        2013228083 A  * 11/2013

* cited by examiner

*Primary Examiner* — Alfred J Wujciak
(74) *Attorney, Agent, or Firm* — Smith Tempel Blaha LLC; Matthew T. Hoots

(57) ABSTRACT

Disclosed is a cable guard device configured to be driven into ground near a transition point on an edge line delineating a yard area from a hardscape. Embodiments of the cable guard device comprise at least one stake portion, a cable guard channel configured to receive a cable, and a cable guard extension. When the cable is received through the cable guard channel and the at least one stake portion is driven into ground near the transition point on the edge line delineating the yard area from the hardscape, the cable channel guard protects from damage a first portion of the cable over the yard area and the cable guard extension protects from damage a second portion of the cable over the hardscape.

6 Claims, 6 Drawing Sheets

WIRE GUARD DEVICE

BACKGROUND

Embodiments of the present solution are generally directed to stakes used in landscaping applications and, more specifically, to stakes configured for securing and protecting a wire or cable exposed at an edger line in a landscape.

Referring to FIG. 1, recent developments in landscape maintenance solutions have produced systems that leverage automowers. Automowers are usually battery driven, robotic lawnmowers that mow a lawn automatically and without user assistance. In addition to the automower itself (not depicted in FIG. 1 illustration), an automower system 100 includes a charging station 105 coupled to a permanent power source, a boundary wire 110 and a guide wire 115. The boundary wire 110 may be installed around a yard to define a boundary, or boundaries, beyond which the automower will not mow. Boundary wires are typically laid along the outer edges of a yard and around landscape beds and the like. In addition to the boundary wire(s), a guide wire 115 may be strategically laid along a longest length of the middle of the yard in order to statistically increase the chances that the automower encounters the guide wire 115 often.

According to some algorithm, the automower constantly mows the yard within the boundary defined by the boundary wires. As one of ordinary skill in the art would understand, when the automower encounters a boundary wire, it changes direction such that it continues to mow within the space defined by the boundary. The automower may continue to mow unless and until its electrical charge is depleted to a certain level, at which point the automower returns to the charging station by following the guide wire. In this way, an automower with a low charge may set a course and continue on the course until it encounters the guide wire and "follows" the guide wire back to the charging station. Once charged, the automower may exit the charging station and resume mowing the yard within the boundary according to the aforementioned algorithm.

Returning to the exemplary illustration of an automower system 100 depicted in FIG. 1, it should be noted that both the boundary wire 110 and the guide wire 115 transverse the driveway 120. The guide wire 115 crosses the driveway 120 at transition point 125, for example. As such, the boundary wire 110 and guide wire 115 may be exposed at the edge of the driveway 120 and vulnerable to being cut or damaged from an edger or "weed eater" equipment. Therefore, there is a need in the art for a wire guard device that may be used to secure the position of a boundary wire or guide wire at the edge of a hardscape while simultaneously providing protection for the wire against damage from an edger or "weed eater" equipment.

These needs, as well as other needs in the art, are addressed in the various embodiments of the solution as presented herein.

BRIEF SUMMARY

The various embodiments, features and aspects of the present invention overcome and/or fill some or all of the above-noted needs in the prior art. Embodiments include a cable guard device configured to be driven into ground near a transition point on an edge line delineating a yard area from a hardscape, such as a walkway or driveway. Embodiments of the cable guard device comprise at least one stake portion, a cable guard channel configured to receive a cable, and a cable guard extension. When the cable is received through the cable guard channel and the at least one stake portion is driven into ground near the transition point on the edge line delineating the yard area from the hardscape, the cable channel guard protects from damage a first portion of the cable over the yard area and the cable guard extension protects from damage a second portion of the cable over the hardscape. When the hardscape is constructed of concrete, a cable guard device may be configured such that the cable it protects lies in an expansion joint of the concrete.

Depending on the particular embodiment, a cable guard device according to the solution may consist of a single stake portion, a pair of stake portions, or a plurality of stake portions. Further, depending on the particular embodiment, a first one of a pair of stake portions may be substantially the same length as a second one of the pair of stake portions. Moreover, a first one of a pair of stake portions may be substantially shorter in length as a second one of the pair of stake portions. And, it is envisioned that a cable guard device according to the solution may be constructed from any malleable material such as, but not limited to, a stainless steel, a carbon steel, an aluminum, and/or a plastic. Also, a cable guard device may be painted in order to prevent or mitigate corrosion and/or to provide an aesthetic benefit.

The above-described and additional features may be considered, and will become apparent in conjunction with the drawings, in particular, and the detailed description that follow.

BRIEF DESCRIPTION OF THE SEVERAL VIEWS OF THE DRAWING

In the drawings, like reference numerals refer to like parts throughout the various views unless otherwise indicated. For reference numerals with letter character designations such as "305L" or "305R", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The present disclosure is directed towards providing a wire guard device that may be used to secure and protect a wire or cable that is laid across an edger line in a landscape. For example, in an automower system, guide wires and/or boundary wires may be exposed at an edge line defined by a grass area juxtaposed to a hardscape such as a driveway or walkway. Typically, in automower system applications, a guide wire or boundary wire may cross a hardscape element, such as a driveway, by being laid in an expansion joint of concrete forming the hardscape element. Importantly, at the point of transition from the grassy area to the hardscape expansion joint, the wire may be exposed to damage by lawn maintenance equipment (such as an edger) due to the wire crossing an edged line maintained along the hardscape. Embodiments of the solution seek to secure the wire in place, thereby mitigating its displacement out of the expansion joint, while protecting the wire from physical damage.

It is envisioned that the scope of the solution will not be limited by choice of materials, as embodiments of the wire guard device solution proposed herein may be constructed from any material suitable for a given application. As a way of example, and not limitation, it is envisioned that some embodiments of the solution may be formed from bending a flat template constructed of a malleable material such as, but not limited to, stainless steel, carbon steel, or aluminum. As another example, it is envisioned that embodiments of the solution may be colored by addition of a powder coated paint or the like. Still other embodiments may be camouflaged for aesthetic reasons by application of a pattern that makes the wire guard device less noticeable in application. Materials of construction and methods of adornment will occur to those of skill in the art.

Turning now to the figures in which like labels refer to like elements throughout the several views, various embodiments, aspects and features of the present invention are presented.

Figure 1:
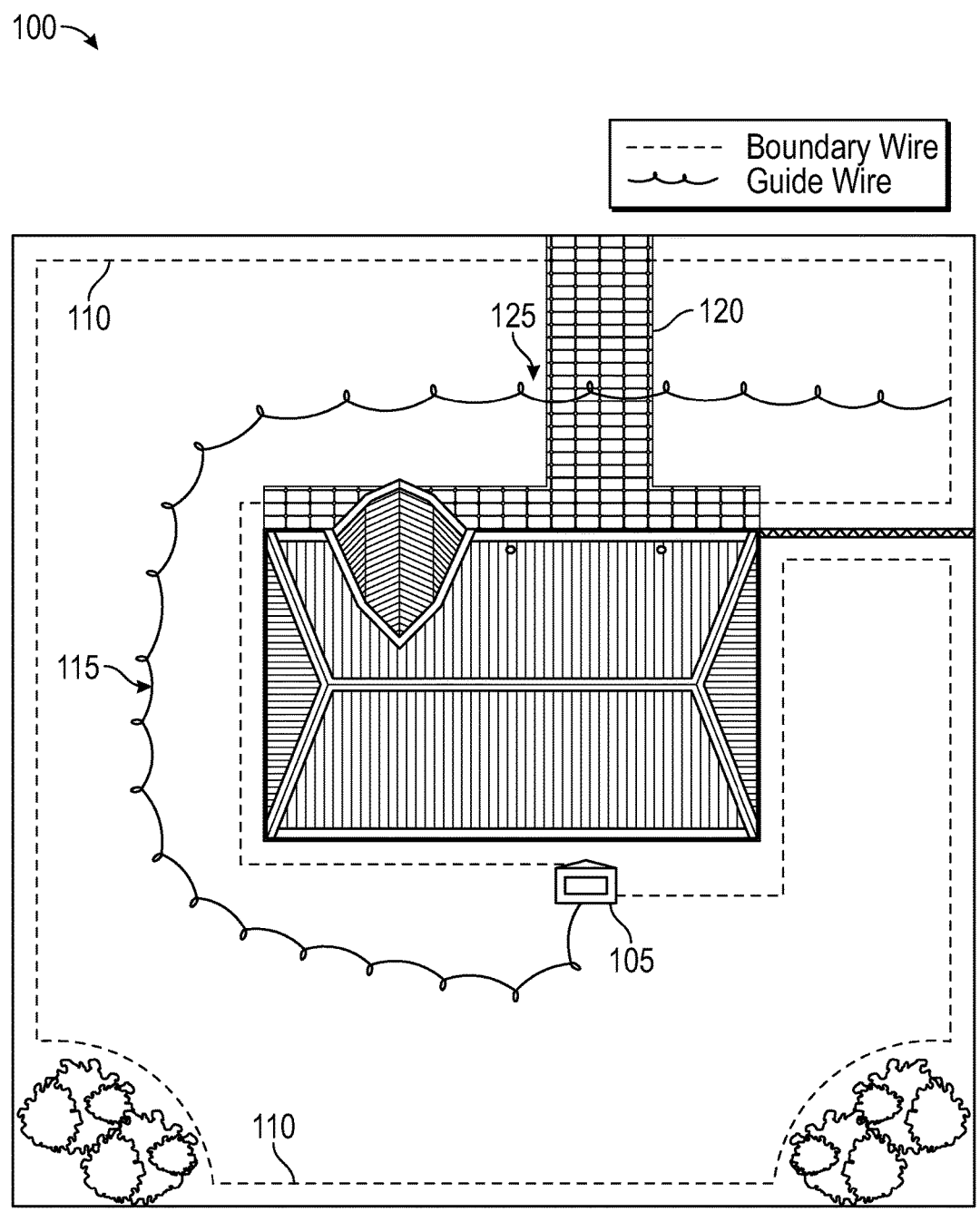
FIG. 1 illustrates an exemplary automower system layout.

FIG. 1 illustrates an exemplary automower system layout 100. As can be seen from the FIG. 1 illustration, a boundary wire 110 defines a grass space within which an automower may mow and a guide wire 115 provides a means by which an automower may navigate itself back to a charging station 105. Notably, in the exemplary illustration, the guide wire 115 crosses driveway 120 at transition point 125. Transition point 125 lies along an edge line of the driveway 120 that may be maintained periodically by use of landscape equipment such as a rotary blade edger or a stringed trimmer (i.e., a "weed eater") or a bed redefiner, as would be understood by one of ordinary skill in the art. Consequently, guide wire 115 may be exposed to damage at transition point 125 from use of landscape equipment to maintain the edge line of driveway 120.

Figure 2:
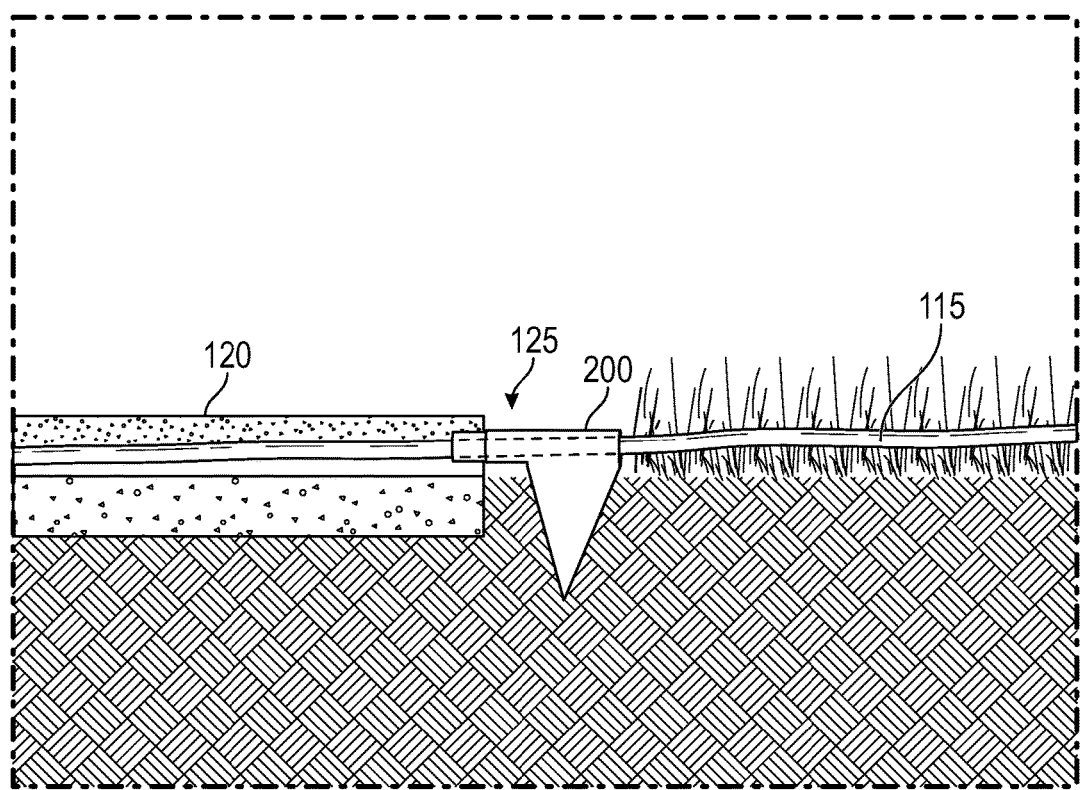
FIG. 2 is a plan view of an exemplary embodiment of a wire guard device according to the solution and installed to secure and protect a wire crossing an edger line of a hardscape.

FIG. 2 is a plan view of an exemplary embodiment of a wire guard device 200 according to the solution and installed to secure and protect a wire, such as guide wire 115, crossing an edge line of a hardscape, such as at transition point 125 of driveway 120. As can be seen in the FIG. 2 illustration, the guide wire 115 extends through the wire guard device 200 and continues in an expansion joint of driveway 120. Advantageously, the wire guard device 200 protects guide wire 115 at the transition point 125 such that guide wire 115 is not exposed at transition point 125. Further, the exemplary wire guard device 200 extends a distance beyond transition point 125 such that the guide wire 115 is protected along a portion of the expansion joint. In this way, there is no gap in the protection of the guide wire 115 at the edge of the driveway 120. Also, as can be understood from the FIG. 2 illustration, the wire guard device 200 includes at least one spike element for securing the wire guard device 200 into the ground.

Figure 3A:
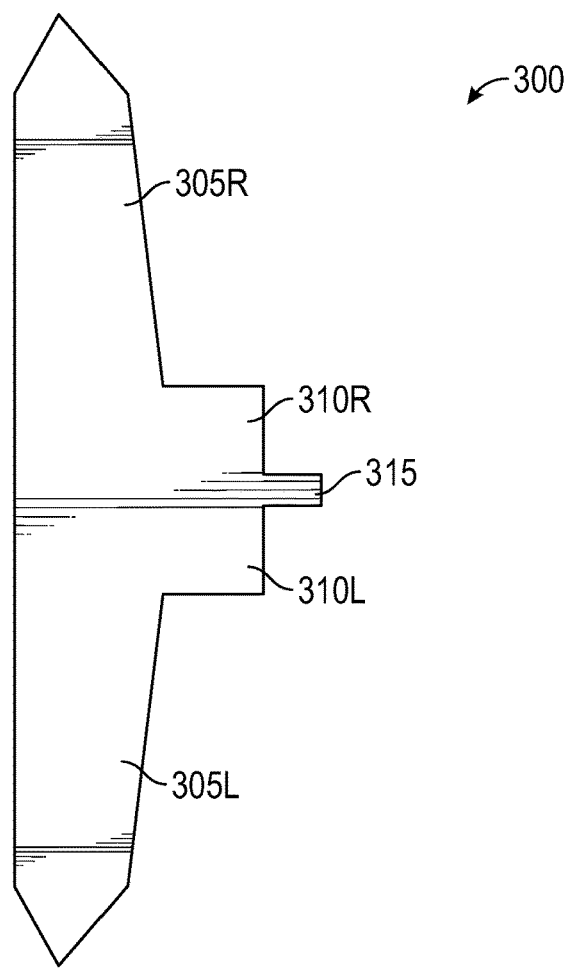
FIGS. 3A-3B collectively illustrate an exemplary embodiment of a wire guard device according to the solution.
Figure 3B:
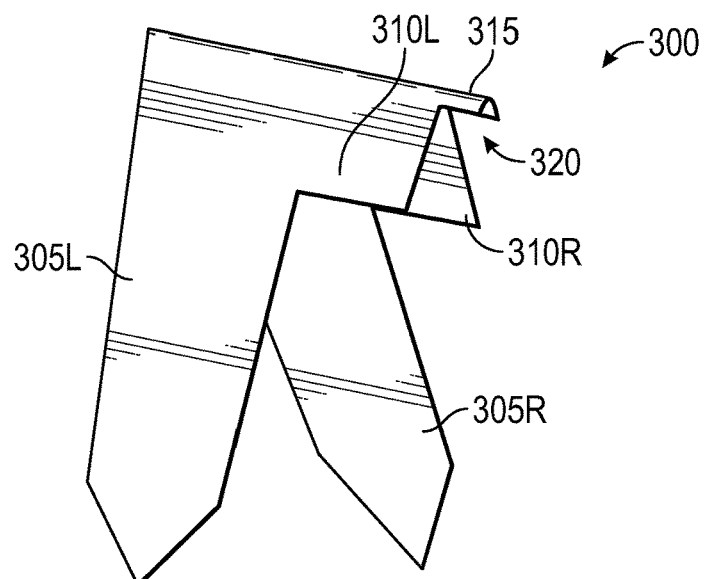

FIGS. 3A-3B collectively illustrate an exemplary embodiment of a wire guard device 300 according to the solution. FIG. 3A depicts the flat template of the wire guard device 300 before it is formed into its ready-for-use application state as shown in FIG. 3B. The exemplary wire guard device 300 includes a left stake portion 305L and a right stake portion 305R. The exemplary wire guard device 300 also includes a left cable guard portion 310L and a right cable guard portion 310R. Further, the exemplary wire guard device 300 includes a cable guard extension 315.

As can be seen and understood from the FIG. 3 illustrations, when formed into its application state (FIG. 3B), the cable guard portions 310 of the exemplary wire guard device 300 cooperate to define a cable guard channel 320 through which a cable may be extended (e.g., FIG. 2 illustration). The left and right stake portions 305 may be driven into the ground such that the exemplary wire guard device 300 secures the cable from displacement. Advantageously, the cable guard extension 315 may be positioned to extend over a portion of the cable lying in an expansion joint of a hardscape (see FIG. 2 illustration).

Figure 4A:
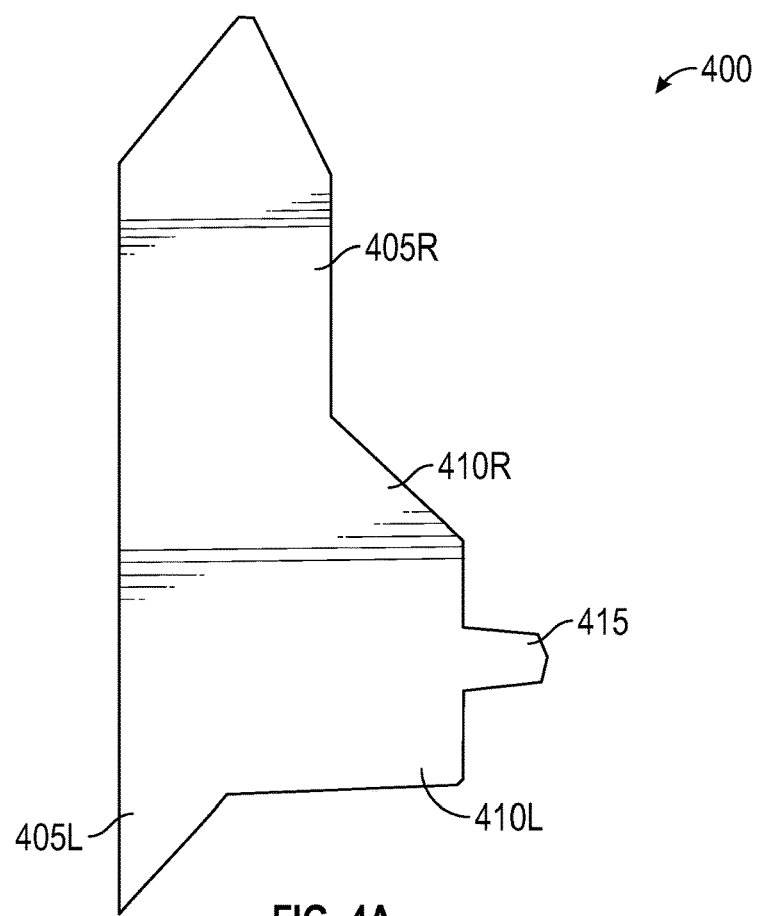
FIGS. 4A-4B collectively illustrate another exemplary embodiment of a wire guard device according to the solution.
Figure 4B:
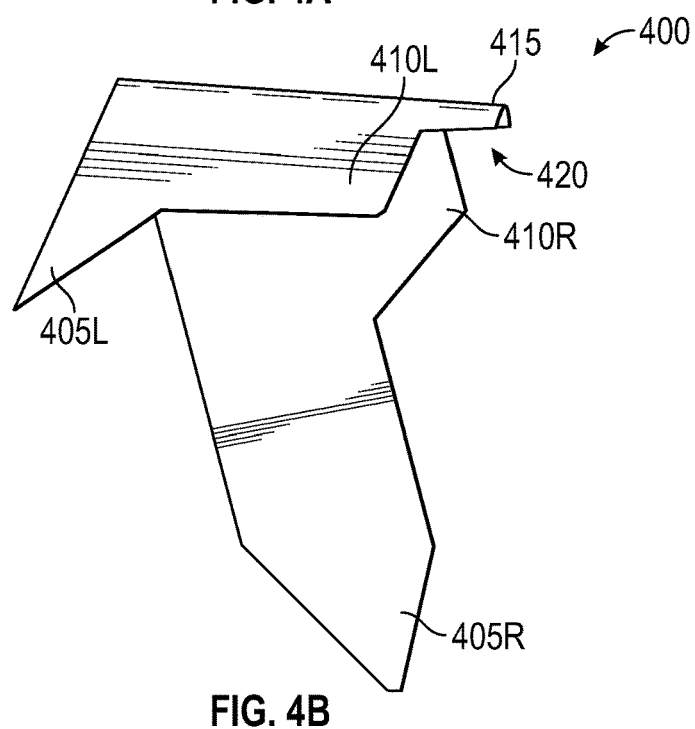

FIGS. 4A-4B collectively illustrate another exemplary embodiment of a wire guard device 400 according to the solution. FIG. 4A depicts the flat template of the wire guard device 400 before it is formed into its ready-for-use application state as shown in FIG. 4B. The exemplary wire guard device 400 includes a left stake portion 405L and a right stake portion 405R. Notably, the left stake portion 405L is relatively shorter than the right stake portion 405R, in order to facilitate easier installation into the ground. The exemplary wire guard device 400 also includes a left cable guard portion 410L and a right cable guard portion 410R. Further, the exemplary wire guard device 400 includes a cable guard extension 415.

As can be seen and understood from the FIG. 4 illustrations, when formed into its application state (FIG. 4B), the cable guard portions 410 of the exemplary wire guard device 400 cooperate to define a cable guard channel 420 through which a cable may be extended (e.g., FIG. 2 illustration). The left and right stake portions 405 (primarily right stake portion 405R) may be driven into the ground such that the exemplary wire guard device 400 secures the cable from displacement. Advantageously, the cable guard extension 415 may be positioned to extend over a portion of the cable lying in an expansion joint of a hardscape (see FIG. 2 illustration).

Figure 5A:
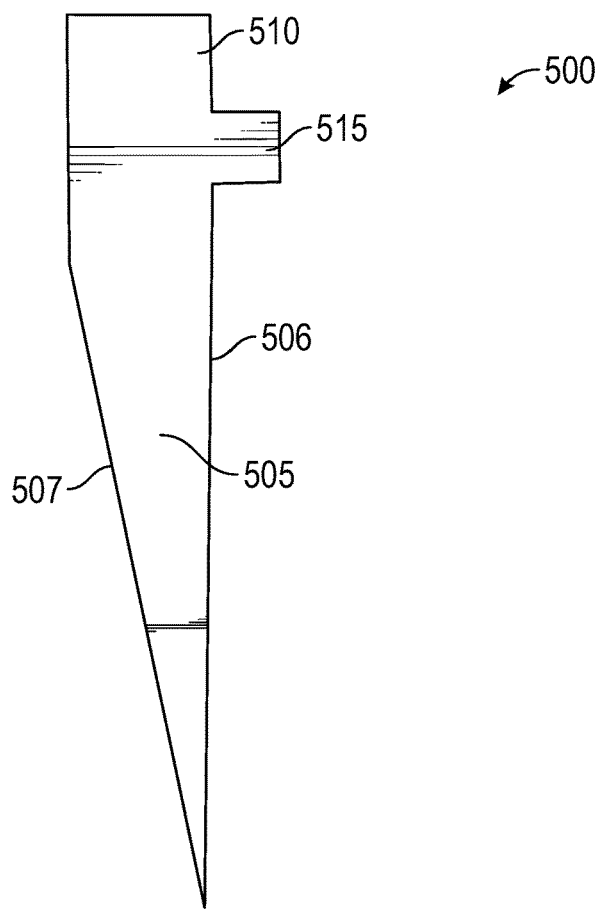
FIGS. 5A-5B collectively illustrate another exemplary embodiment of a wire guard device according to the solution.
Figure 5B:
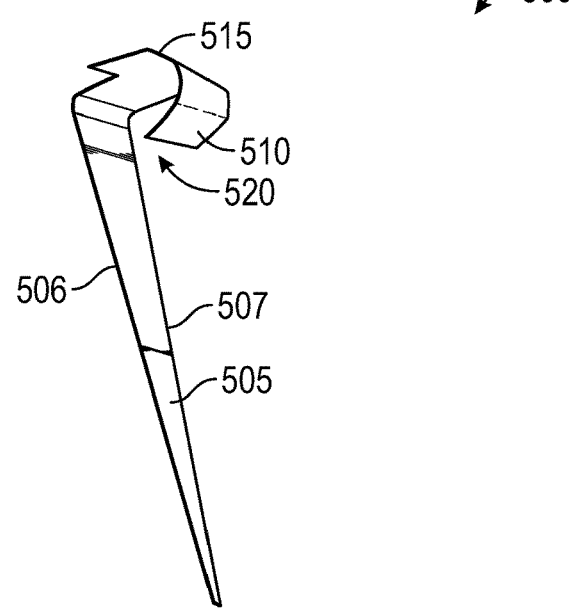

FIGS. 5A-5B collectively illustrate another exemplary embodiment of a wire guard device 500 according to the solution. FIG. 5A depicts the flat template of the wire guard device 500 before it is formed into its ready-for-use application state as shown in FIG. 5B. The exemplary wire guard device 500 includes a stake portion 505. Notably, the stake portion 505 includes a straight front edge 506 and a tapered back edge 507, in order to facilitate easier installation into the ground. Moreover, as the stake portion 505 is driven into the ground, with the straight front edge 506 positioned against a hardscape element (such as a driveway 120 edge), the tapered back edge 507 of the stake portion 505 may generate a force that urges the wire guard device 500 toward the hardscape and, thereby, insure that the wire guard device 500 is positioned "snugly" against the hardscape edge. The exemplary wire guard device 500 also includes a cable guard portion 510. Further, the exemplary wire guard device 500 includes a cable guard extension 515.

As can be seen and understood from the FIG. 5 illustrations, when formed into its application state (FIG. 5B), the cable guard portion 510 of the exemplary wire guard device 500 defines a cable guard channel 520 through which a cable may be extended (e.g., FIG. 2 illustration). The stake portion 505 may be driven into the ground such that the exemplary wire guard device 500 secures the cable from displacement.

Advantageously, the cable guard extension 515 may be positioned to extend over a portion of the cable lying in an expansion joint of a hardscape (see FIG. 2 illustration).

Figure 6A:
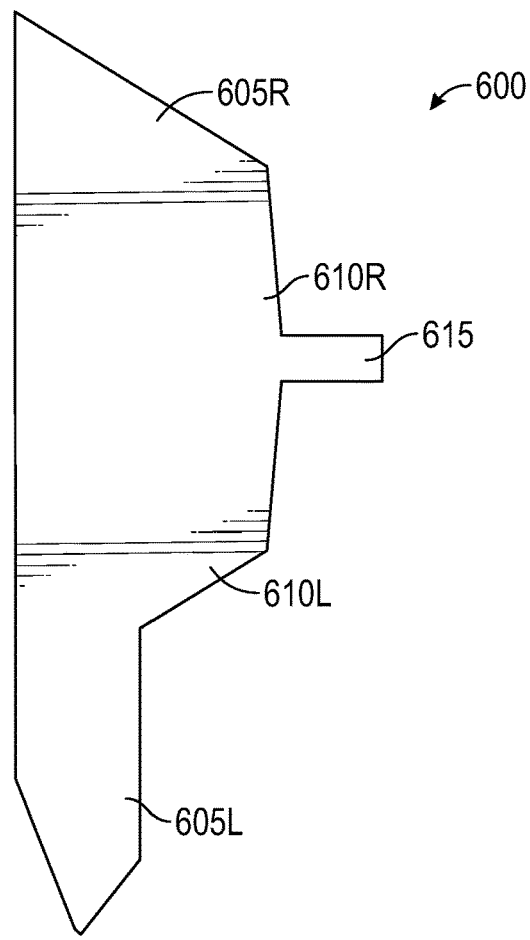
FIGS. 6A-6B collectively illustrate another exemplary embodiment of a wire guard device according to the solution.
Figure 6B:
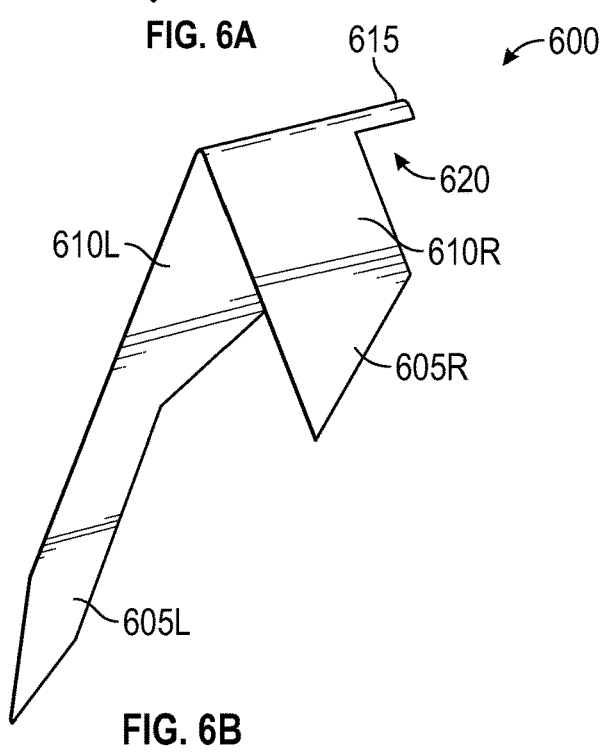

FIGS. 6A-6B collectively illustrate another exemplary embodiment of a wire guard device 600 according to the solution. FIG. 6A depicts the flat template of the wire guard device 600 before it is formed into its ready-for-use application state as shown in FIG. 6B. The exemplary wire guard device 600 includes a left stake portion 605L and a right stake portion 605R. Notably, the left stake portion 605L is relatively shorter than the right stake portion 605R, in order to facilitate easier installation into the ground. The exemplary wire guard device 600 also includes a left cable guard portion 610L and a right cable guard portion 610R. Further, the exemplary wire guard device 600 includes a cable guard extension 615.

As can be seen and understood from the FIG. 6 illustrations, when formed into its application state (FIG. 6B), the cable guard portions 610 of the exemplary wire guard device 600 cooperate to define a cable guard channel 620 through which a cable may be extended (e.g., FIG. 2 illustration). The left and right stake portions 605 (primarily left stake portion 605L) may be driven into the ground such that the exemplary wire guard device 600 secures the cable from displacement. Advantageously, the cable guard extension 615 may be positioned to extend over a portion of the cable lying in an expansion joint of a hardscape (see FIG. 2 illustration).

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A cable guard device configured to be driven into ground near a transition point on an edge line delineating a yard area from a hardscape, the cable guard device comprising:
   a pair of mirror image stake portions;
   a pair of mirror image cable guard portions;
   a pair of mirror image cable guard extension portions;
   wherein when the cable guard device is folded along a single symmetry line, the pair of mirror image stake portions, the pair of mirror image cable guard portions, and the pair of mirror image cable guard extension portions cooperate to define a substantially smooth cable guard channel configured to receive a cable; and
   wherein when the cable is received through the substantially smooth cable guard channel and the pair of mirror image stake portions are driven into ground near the transition point on the edge line delineating the yard area from the hardscape, a first section of the substantially smooth cable guard channel defined by the pair of mirror image stake portions and the pair of mirror image cable guard extension portions protects a first portion of the cable residing over the yard area and a second section of the substantially smooth cable guard channel defined by the pair of mirror image cable guard extension portions protects a second portion of the cable residing over the hardscape.

2. The cable guard device of claim 1, wherein the cable guard device is constructed from a malleable metal.

3. The cable guard device of claim 2, wherein the malleable metal is one of the group consisting of stainless steel, carbon steel, and aluminum.

4. The cable guard device of claim 1, wherein the cable guard device is constructed from a plastic.

5. The cable guard device of claim 1, wherein the cable guard device is painted.

6. The cable guard device of claim 1, wherein each of the stake portions comprises a straight edge and a tapered edge.

\* \* \* \* \*